United States Patent [19]

Taguchi et al.

[11] 3,852,774
[45] Dec. 3, 1974

[54] ELECTRIC SHUTTER FOR SINGLE LENS REFLEX CAMERA

[75] Inventors: Tatsuya Taguchi, Tokyo; Yukio Lura, Kawasaki; Yoshiyuki Takishima, Tokyo, all of Japan

[73] Assignee: Canon Kabushiki Kaisha, Ohta-ku, Tokyo, Japan

[22] Filed: Nov. 21, 1972

[21] Appl. No.: 308,442

Related U.S. Application Data

[63] Continuation of Ser. No. 106,872, Jan. 15, 1971, abandoned.

[30] Foreign Application Priority Data

Jan. 16, 1970 Japan.................................. 45-4703
Feb. 10, 1970 Japan............................ 45-013174

[52] U.S. Cl........................ 354/24, 354/31, 354/51
[51] Int. Cl............................................... G01j 1/00
[58] Field of Search........ 95/10 CT, 53 EB; 340/173; 354/24, 31, 51

[56] References Cited
UNITED STATES PATENTS

| | | | |
|---|---|---|---|
| 3,053,985 | 9/1962 | Grammer, Jr. et al. | 95/10 CT |
| 3,324,779 | 6/1967 | Nobusawa et al. | 95/53 EB |
| 3,426,357 | 2/1969 | Paulus | 95/10 CT |
| 3,442,190 | 5/1969 | Erickson | 95/10 CT |
| 3,512,140 | 5/1970 | Yokozawa et al. | 340/173 |
| 3,533,348 | 10/1970 | Yanagi | 95/10 CT |
| 3,641,890 | 2/1972 | Ono | 95/10 CT |
| 3,679,905 | 7/1972 | Watanabe | 95/10 CT |

FOREIGN PATENTS OR APPLICATIONS

| | | | |
|---|---|---|---|
| 4,418,672 | 8/1969 | Japan | 95/10 CT |
| 4,225,208 | 12/1967 | Japan | 95/10 CT |

OTHER PUBLICATIONS

"Devices and Systems at Work," Feb. 1970, Control Engineering, page 79, Vol. 17, No. 2.

Primary Examiner—Samuel S. Matthews
Assistant Examiner—Russell E. Adams, Jr.
Attorney, Agent, or Firm—David Toren

[57] ABSTRACT

In the electric shutter control disclosed, a logarithmic compression circuit compresses the output of a light measuring apparatus and stores the compressed value in a memory element such as a capacitor. A first switch apparatus that responds to initial depression of a shutter release button stops storage changes in the memory element by disconnecting the element both from the compression circuit and the light measuring apparatus. A second switch apparatus responding to further depression of the shutter button opens a short circuit across a timing capacitor at the time the shutter is opened. While the shutter is open, the timing capacitor charges through an arrangement whose resistance depends upon the value stored in the memory element. When the charge across the timing capacitor reaches a threshold value, an actuating circuit closes the shutter. According to one embodiment of the invention, the memory element in the form of a capacitor forms a feedback path for an operational amplifier. The compression circuit also forms a feedback path for the operational amplifier while the light measuring apparatus forms the input to the operational amplifier. The first switch apparatus disconnects the compression circuit and the light measuring apparatus from the operational amplifier while the capacitor remains connected to the operational amplifier. Suitable attenuating means vary the shutter operation on the basis of the sensitivity of the film in the camera and the distance to the subject, where necessary.

30 Claims, 13 Drawing Figures

PATENTED DEC 3 1974 3,852,774

INVENTORS
TATSUYA TAGUCHI
YUKIO IURA
BY YOSHIYUKI TAKISHIMA

Toren & McGeady
ATTORNEYS

INVENTORS
TATSUYA TAGUCHI
YUKIO IURA
BY YOSHIYUKI TAKISHIMA

Foren & McGeady
ATTORNEYS

ELECTRIC SHUTTER FOR SINGLE LENS REFLEX CAMERA

This is a continuation of application Ser. No. 106,872 filed Jan. 15, 1971, now abandoned.

This invention relates to single lens reflex cameras using through-the-lens light measuring systems and electrically controlled shutters.

An object of the present invention is to improve electrically controlled shutters.

According to features of the invention, the output of a light measuring circuit having a photoconductive element that receives light through a photographic lens, is applied to an operational amplifier. A memory element is formed by a memory capacitor connected in negative feedback relation between the output and the input of the amplifier. A feedback circuit connected across the capacitor includes a logarithmic compression arrangement. The output of the light measuring circuit is thus logarithmically compressed. Switch means break the connection between the light measuring circuit and the operational amplifier so as to store the value of the measured light in the capacitor. The time constant of an electronic time constant circuit is controlled by variation of the operational amplifier. The time constant circuit regenerates the value of the light measured before storage in such a manner that the exposure time is determined with the regenerated time constant.

Below the present invention is explained in detail according to the drawings.

FIG. 1 is a block circuit diagram showing the use of the electric shutter in a single lens reflex camera using a T.T.L. light measuring system.

Figure 1:
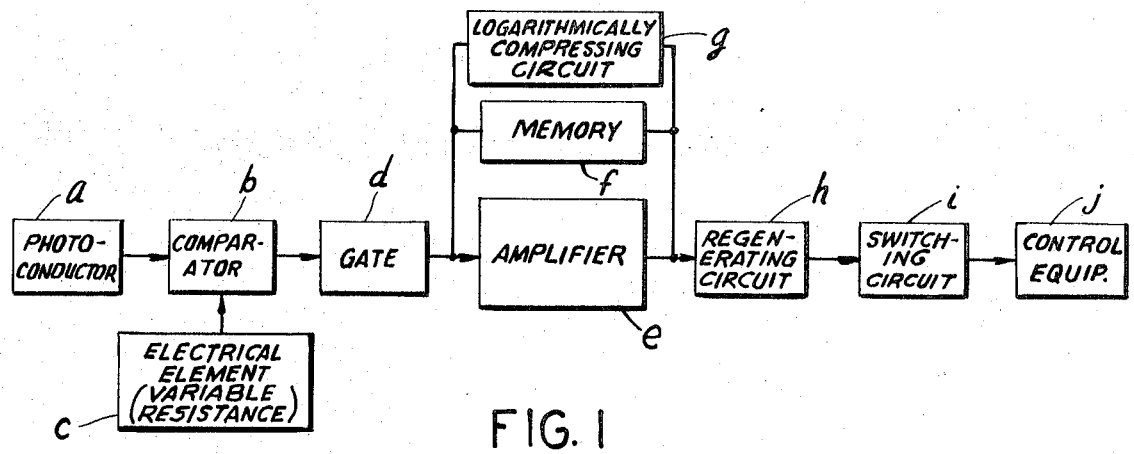
FIG. 1 is a block circuit diagram to show the principle of the present invention.

In FIG. 1 a light receiving photoconductive element $a$ receives light coming through the photographic lens. A comparator $b$ receives the output from the element $a$ as well as from an electrical element $c$ like variable resistance which responds to photographic information such as the diaphragm setting, the sensitivity of the film and so on. In the drawing the comparator $b$ and the electrical element $c$ are provided before an operational amplifier $e$ to be explained later, and form the light measuring circuit together with the light receiving element $a$. A gate-circuit $d$ supplies the output of the comparator $b$ to the operational amplifier $e$. A memory device $f$ and a logarithmically compressing circuit $g$ are each connected between the in-put terminal and the out-put terminal of the operational amplifier $e$ to form a negative feed-back circuit. A regenerating circuit $h$ preferably including a logarithmic extending circuit, overcome the difficulty of matching characteristics by applying the above mentioned logarithmic compressing circuit being switched-over as the logarithmically extending circuit. A switching circuit $i$ contains a time constant circuit to be controlled by the out-put of the regenerating circuit. Control equipment $g$ controls the movement of the shutter to be driven by the switching circuit $i$, and is composed of an electromagnet when a mechanical focal plane shutter or the like is being controlled. This control equipment $j$ can naturally be considered a light quantity changing element to control the quantity of light coming through the photographic lens or its reflected quantity. Further, the principle of the present invention can be applied to camera systems other than a single lens reflex camera in which the light quantity need not always be memorized.

Below the operation is explained according to the block circuit diagram shown in FIG. 1.

The light quantity is first converted by the light receiving element $a$ into an electrical quantity, which is passed to the comparator $b$. The electrical element $c$ is a circuit for introducing photographic information. The circuit way for example include a variable resistor responding to a preset value of the diaphragm of a single lens reflex camera with the light measuring system in opened state of diaphragm and another variable resistor corresponding to the sensitivity of film in such a manner that they can be adjusted independently of each other so that a proper exposure time of the camera system can automatically be decided simply by adjusting them. The characteristics of these variable resistors can generally be represented in B-curve or A-curve, so that in case the values of these resistors are adjusted by moving sliders, the value of resistors can easily be compensated for various fully opened apertives of the interchangeable lenses and for E.E. photography with various sensitivities of films, by moving the bodies of the above mentioned variable resistors. Further, the valve adjusters of diaphragm, and the shooting distance for automatic photoflash are to be connected with the outer terminals.

As the light receiving element, either a photo voltaic element or a three terminal photoconductive element, a photoconductive element of high resistance electrode type or the like whose gamma characteristics is compensated for a very wide range of luminosity of the object to be photographed can be used. Hereby the characteristics can also be compensated with the gamma compensating circuit.

As explained above, the information signal of the light receiving element $a$ and that of the electrical element $c$ are led to the comparator $b$ consisting of a circuit such as an differential amplifier, a D.C. amplifier, an operation amplifier, a bridge circuit and so on. In this case especially by so providing that the electrical element $c$ and the comparator $b$ are built in the operation amplifier $e$ and that the out-put of $a$ is led to the operation amplifier $e$ through the gate circuit $d$, the calculation for exposure carried out with multiplication and division can be converted into the one carried out with addition and substraction through the logarithmic compression circuit. In case the logarithmic compression circuit is adopted, the same adjusting system for exposure as the conventional one can be used in such a manner that even if the sensitivity of film, the value of diaphragm and so on are adjusted with the bias voltage which can be adjusted independently of each other, they can conveniently be treated in the calculation without modification. The gate circuit $d$ consists of a mechanical contact switch, or a relay switch, a contactless switch such as E.E.T. transistor and so on, and when this gate circuit is switched once, the electrical quantity passing this circuit is logarithmically compressed and given to the memory circuit $f$ of the operation amplifier $e$.

$e$ consists for example of an operational amplifier of differential in-put type and has an integrator with at least one memory capacitor in its negative feed back circuit in order to compose a memory circuit $f$. The logarithmic compressing circuit $g$ is provided with a switch which is broken when the gate circuit $d$ is broken.

The out-put of the operational amplifier $e$ is given to the logarithmically extending regeneration circuit $h$, and when the exposure with the proper shutter time corresponding to the regenerated light quantity measured by T.T.L. system is fulfilled, for example the electromagnet $j$ is actuated by the inverted voltage of the switching circuit $i$ in such a manner that the movement of the second curtain of shutter is controlled. Hereby the regenerating circuit $h$ can be provided with an indication circuit such as oscillation circuit, a lamp circuit and so on in advance in such a manner that the shutter time can always be indicated.

Figure 2:
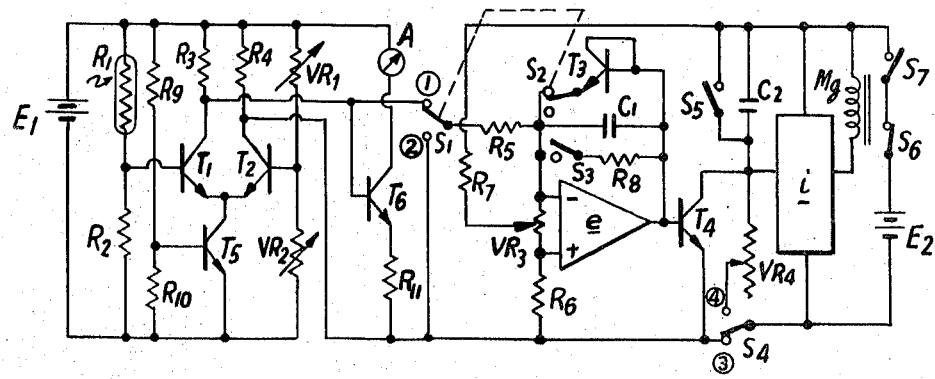
FIGS. 2 and 3 are respectively an electrical circuit diagram of an embodiment of the present invention.

FIG. 2 is an electrical circuit diagram of a first embodiment of the present invention. In the diagram member $E_1$ is a battery serving as an electrical source for the light measuring circuit, $E_2$ is a battery serving as an electrical source for the main circuit of an electronic shutter control circuit, $R_1$ is a light receiving element, members $R_2$, $R_3$ and $R_4$ respectively are a setting resistors serving to compensate variations in the temperature and the circuit construction, whereby gamma compensation of $R_1$ is also possible with $R_2$. Members $R_5$ and $R_6$ are resistors which have the same value of resistance, $R_7$, $R_8$, $R_9$, $R_{10}$ and $R_{11}$ are resistances. Transistors $T_1$ and $T_2$ form a differential amplifier, member $T_3$ is a diode connected transistor forming a logarithmic compression circuit, $T_4$ is a transistor having a logarithmically extending characteristic and forming a regeneration circuit, and member $T_5$ is a transistor serving to stabilize the circuit, $T_6$ is an amplifying transistor connected with the out-put circuit of the differential amplifier.

Members $VR_1$ and $VR_2$ are respective variable resistors for setting the value of diaphragm and the sensitivity of film, $VR_3$ is the variable resistor for internal adjustment (zero adjustment) of the operation amplifier $e$, $VR_4$ is a setting resistor for shutter time for manual setting. Component A is an ammeter, $M_g$ is an electromagnet; $C_1$ is a memory capacitor $C_2$ a condensor for deciding a shutter time. $S_1$ is such a switch that the value of the measured light is stored in the memory capacitor $C_1$ always renovated when it lies on the terminal ① and the final value to be stored is stored in it when it lies on the terminal ②, $S_2$ is a switch which is functionally connected with $S_1$ in such a manner that $S_2$ is switched off when $S_1$ lies on the terminal ② and switched on when $S_1$ lies on the terminal ①. $S_3$ is the switch for discharging the change across the capacitor $C_1$, $S_4$ is such a change-over switch that the shutter time is automatically set when $S_4$ is connected with the terminal ③ and manually set when $S_4$ is connected with the terminal ④, $S_5$ is a starter switch for discharging the charge across the condensor $C_2$, $S_6$ is a switch for bulb exposure, and $S_7$ is a main switch which is acted for example with a shutter button. Hereby the main switch can be inserted in the electrical source for the light measuring circuit, whereby the electrical source can be used in common.

Below the operation of the circuit of the embodiment in FIG. 2 is briefly explained. The four elements, namely the light receiving element $R_1$ the fixed resistor $R_{10}$, the variable resistor $VR_1$ for setting the sensibility of film and the variable resistor $VR_2$ for the value of the preset diaphragm of the photographic lens form a conventional bridge circuit. Between the detecting terminals of the bridge transistors $T_1$ and $T_2$ amplify the out-put in a differential way, whereby the difference between the collector potential of $T_1$ and that of $T_2$ is led to the terminals ① and ②. The base voltage of the transistor $T_5$ is established by the resistors $R_9$ and $R_{10}$ for temperature compensation so that the electrical currents of the emitters of the above mentioned transistors $T_1$ and $T_2$ are stabilized. The out-put between the above mentioned terminals ① and ② is applied between the base and the emitter of the transistor $T_6$ through the resistor $R_{11}$ while the ammeter A is provided at its collector as the collector load, so that the shutter time can be known in advance independent of the memory.

Below the operational of the operation amplifier is explained with respect to the embodiment in FIG. 2.

At first $S_5$ is switched on, $S_3$ is also switched on and $S_1$ is put on the terminal ② in such a manner that the charges across the capacitor $C_1$ and the capacitor $C_2$ are discharged. Only $S_2$ is switched off and $VR_3$ is adjusted so that the out-put voltage does not vary with time. At this state $S_1$ is switched to terminal ①, $S_2$ is switched on $S_3$ is switched off, $S_4$ is set to the terminal 3, $S_5$ is switched on and $S_6$ is switched on. The in-put voltage from the terminal ① is applied to one side of $e$ through $R_5$ in such a manner that the integration is started. The electrical charge corresponding to the potential difference between the terminals integrated according to the diode characteristics of $T_3$ is charged across the capacitor $C_1$ and logarithmically compressed. The voltage between the terminals of $C_1$ varies according to the in-put from the terminal ①, which means that the measured value of light is stored and always renewed. When the gauged switches $S_1$ and $S_2$ are actuated so that $S_1$ is on the terminal ② and $S_2$ is switched off, the in-put of the operational amplifier which is of differential in-put type, balances because the values of the resistors $R_5$ and $R_6$ are identical with each other. This causes the charge across the capacitor $C_1$ to remain stored, thereby setting up a potential to be supplied to the base of the transistor $T_4$ of the next stage. When the switch $S_5$ synchronized with the movement of the first curtain of the shutter is opened falls down and the potential of the collector of $T_4$ drops to the switchover voltage of the switching circuit $i$, the switching circuit $i$ is switched over in such a manner that the electrical current running through the electromagnet $M_g$ is cut-off so that the second curtain of shutter is closed. This completes exposure of the film frame.

According to an aspect of the invention the transistor $T_3$ provided in parallel to the capacitor $C_1$ is used to discharge the capacitor $C_1$. This eliminates the discharging switch $S_3$ with a slight modification.

Figure 3:
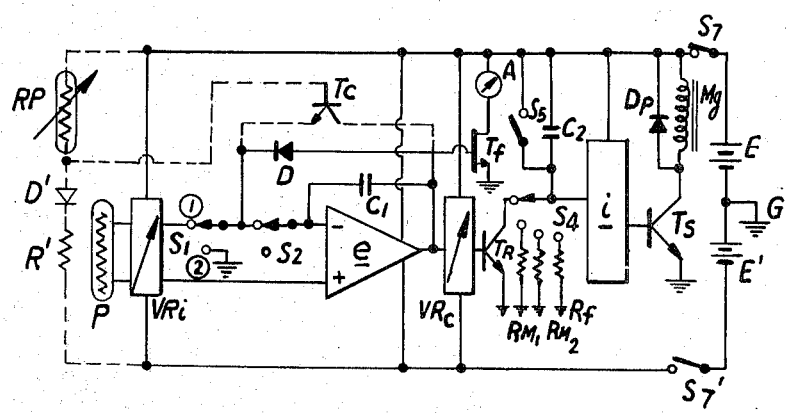

FIG. 3 is an electrical circuit diagram of another embodiment of the present invention. In the drawing the batteries E and E' serving as a D.C. electrical source are grounded at the camera body. Element P is a light receiving element for the T.T.L. through the lens light measurement, $VRi$ the adjuster composed of a variable resistor, potentiometer or the like, and $S_1$ and $S_2$ are switches which are functionally connected in such a manner that when as shown in the diagram, $S_1$ contacts the terminal 1 and $S_2$ is switched on, the light quantity received in the element P is measured. Component $e$ is the operation amplifier, $C_1$ is the memory capacitor, A is a meter, $Tf$ is a field-effect transistor, D is a logarithmic diode. Elements R' and D' are respectively a resistor and a diode for temperature compensation, $R_p$ the external light receiving element, $Ti$ is a transistor whose bare potential is controlled by an external light receiving element $R_p$. Elements R', D', $R_p$ and $T_c$ form another circuit having a compressing effect on the measuring range of light without using the logarithmic diode. When this alternate circuit is inserted, the logarithmic diode is unnecessary, while when the logarithmic diode is inserted, R', D', $R_p$ and $T_c$ is unnecessary. However, it is possible to use both of them in order to improve the characteristics, or in order to change-over from one to the other. Component VRL is an adjuster consisting of the variable resistor, the potentiometer or the like, TR is a regenerating transistor, $C_2$ is a capacitor forming a time constant circuit together with the output circuit between the collector and the emitter of TR, $S_5$ is a starter switch inducing the discharge of the charge across the condensor $C_2$ and at the same time being functionally connected for example with the start of movement of the first curtain of shutter, $i$ is a switching circuit, $T_s$ is a transistor to controle the movement of the shutter, M$g$ is an electromagnet, and D$p$ is a protection diode of the transistor T$s$. Resistor $RM_1$, $RM_2$ and so on form parts of time constant circuits for the manual shutter, while $Rf$ composes the time constant circuit for the shutter of flash-photography. Depending on photographing conditions, the circuit element such as VR$i$, VR$_c$, $C_2$, $R_p$, $i$ and so on can be partially omitted in such a manner that the information signals for picture taking such as of the value of diaphragm, the sensitivity of the film, the shooting distance and so on can be introduced in order to meet various photographing conditions. Component VR$_c$ produces logarithmic compression so that it converts with multiplication and division addition and substraction. This simplifies the treatment of the information signals in this part of the circuit. Further the diaphragm, the filter and so on can be installed before the external light receiving element $R_p$.

According to an embodiment of the invention, resistors $R_{M_1}$, $R_{M_2}$, ... R$f$ are installed in a place corresponding to that of VR$_c$. This make handling of the camera remarkably convenient. The meter indication always corresponds to the electrical charge of the memory capacitor $C_1$, so the permanent indication of the measured light is made possible. According to an embodiment of the invention, the meter is replaced with indication lamps, whereby the According to an embodiment of the invention, the characteristics of the light receiving element P is improved by providing a compensation circuit in advance and providing the element $p$ together with the above mentioned adjuster VR$i$ at the out-put step of the above mentioned compensation circuit RR1.

The third embodiment relates to a camera system having an electric shutter, and in particular, to such a useful system provided with a memory for storing photometric values obtained by TTL photometry, which system is characterized in that the output of a photometric circuit is compressed in a logarithmic manner before being imput to a memory device. The photometric circuit includes a light-receiving element upon which light is caused to impringe, after passing through an objective provided for taking pictures, to have a stored value kept in the memory device before the light passage is interrupted. The camera system includes an electric shutter that is driven by an output regenerated from the stored value in the memory so as to provide a logarithmically extended photometric value of the photometric circuit. The system is further characterized by the provision of a pair of variable resistors which are connected as an adder mechanism across the input or output end of the memory device or elsewhere within the system and are adapted to be driven by a bias source, having voltage regulation means, the variable resistors being slidably engaged by a pair of sliders 111, 112 independently, which have their other end connected with the memory device, the output thereof or the regeneration circuit thereof.

This embodiment will be described more fully below with reference to the drawings.

Figure 4:
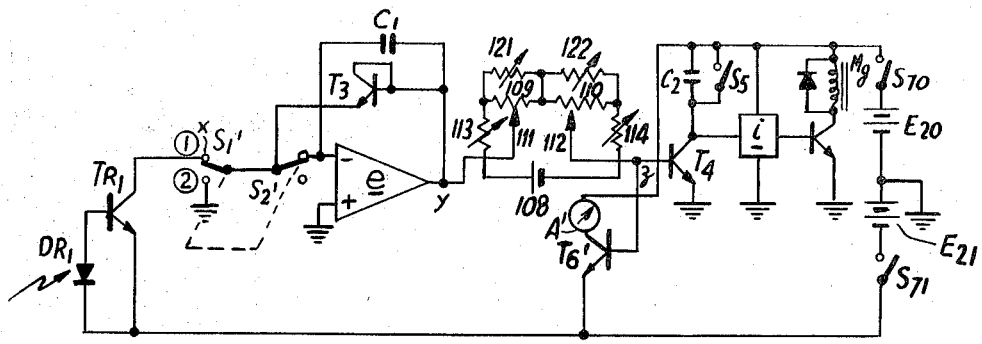
FIG. 4 is an electrical wiring diagram showing another embodiment of the camera system having an electrical shutter according to the present invention.

In FIG. 4, numeral $DR_1$ denotes a photo-diode, $TR_1$ a transistor, $S_1'$ an interlocked switch provided for keeping a storage, $T_3$ a log-diode, $S_2'$ a switch interlocked with the switch $S_1'$, $C_1$ a memory capacitor, $E_{20}$ and $E_{21}$ supply batteries, $S_{70}$ and $S_{71}$ power switches, 108 a bias source battery, 109 and 110 resistors having linear characteristics and associated with the diaphragm aperture and film sensitivity, respectively, 111 and 112 sliders, 113 and 114 as well as 121 and 122 adjustable resistors, $T_g'$ a transistor, A' an ammeter, $T_4$ a transistor, $C_2$ a capacitor, $i$ a switching circuit, M$g$ an electromagnet, $S_5$ a start switch opened by interlocking motion with the start of shutter operation, and $e$ an operation amplifier.

Figure 5:
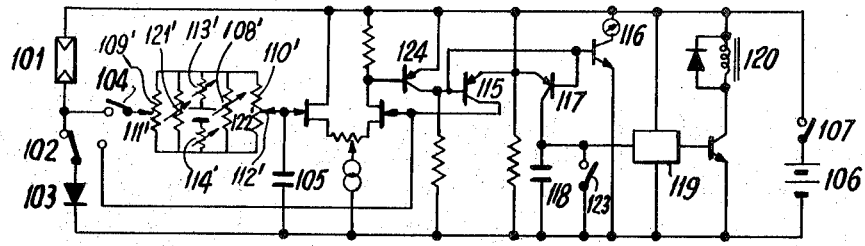
FIGS. 5 to 10 are respectively an explanation drawings to explain important parts of the camera system according to the present invention.

FIG. 5 shows the main parts of the camera system according to the present invention in perspective view. The important elements to introduce the film sensitivity into the camera system are shown for a 35 mm. camera film. The setting of the exposure time is carried out manually and the drawing shows the state in which the exposure time is just about to be set on B for bulb exposure.

Below the construction and operation are explained according to the drawing. The camera body 1 is equipped with the lens 2, while the interchangeable pentagonal prism assembly is dismounted and the back cover 3 is opened. On the 35 mm. film magazine 4 a protrusion 5 corresponds to the sensitivity of the film. The magazine 4 is placed in the magazine chamber 6 of the camera body 1. When the back cover 3 is closed, the back cover claw 7 engages the camera body claw 8 in such a manner that the back cover 3 is locked closed, while at the same time by means of the protruding lever 9 provided on the back cover 3 the intermediate lever 10, while being limited by the above mentioned protrusion 5 in such a manner that the sensitivity of film is automatically set on the setting means of the electronic shutter according to the present invention.

Figure 6:
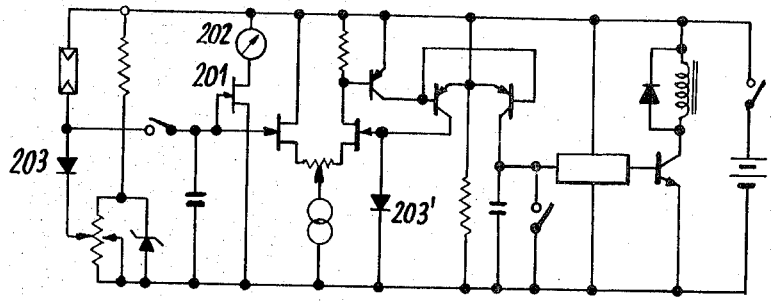

FIG. 6 is the side view of FIG. 5.

When the back cover 3 is closed, the protruding lever 9 under the effect of a leaf spring 11 pushes the intermediate lever 10 supported by the pivot 12 in such a manner that the rotary disc 15 having a sliding contact 14 and supported face to face with the cut off disc 13 having a variable resistor VR for setting the sensitivity of the film is rotated against the coil spring 16. At this time the intermediate lever 10 is controlled by means of the protrusion 5 according to the sensitivity of the film contained in the above mentioned magazine 4 in such a manner that the sensitivity of film is automatically set in the camera. So far the camera is equipped with the setting dial for the sensitivity of film, in such a manner that the sensitivity of film can be set in the camera from outside even when the film magazine does not bear the film sensitivity signal.

A stopper 17 limits rotation of the magazine 4 at the outlet of film. Thus the above mentioned protrusion 5 corresponding to the sensitivity of film assumes a certain determined angular relation to the above mentioned film outlet so that the above mentioned film magazine 4 is rotationally fixed by the above mentioned stopper 17. The magazine chamber 6 and the magazine presses element 18 on the back cover. Thus sensitivity of the film can be automatically set in the camera simply by putting the magazine 4 in the magazine chamber 6 and closing the back cover 3. The setting disc 20 around the rewinding knob serves to set the film sensitivity, by being manually rotated. The setting is enabled because the pin 19 of the setting disc 20 engages the above mentioned rotary disc 15. The compensation piece 21 serves to carry out the exposure compensation by about ± 1 step in case of E.E. photography, by being manually rotated around the setting disc 20. The setting is enabled because the pin 21' of the compensation piece 21 engages the cut-off 13a of the above mentioned disc 13. The spring 21'' serves to make the compensation piece 21' return to the original position when the compensation piece 21' is released from hand in case of manual compensation.

The construction of shutter for bulb exposure B is explained according to FIG. 5, 23 and 24 are respectively a curtain of the focal plane shutter, 25 is a element functionally connected with the movement of the first curtain 23 of shutter 26 the element functionally connected with the movement of the second curtain 24 of shutter. When the automatic diaphragm mechanism, a mirror lifting mechanism and so on, are actuated by means of a release element 28 functionally connected with the shutter button 27, the securing lever 29 is released. Then the cam 30 functionally connected with the movement of the first curtain 23 is rotated. At the same time the stopping lever 31 releases the above mentioned element 25 functionally connected with the movement of the first curtain 23 to start the movement of the first curtain 23. At the same time the set lever 33 which has kept the electromagnet 32 in set state, being functionally connected with the above mentioned cam 30 functionally connected with the movement of the first curtain, is also retired and the second curtain stopping lever 34 is rotated by the spring 35 at the time point when the above mentioned electromagnet 32 loses it holding power in such a manner that the element 26 functionally connected with the movement of the second curtain 24 is released, to permit the second curtain 24 to close and thus the exposure is finished. When the element 26 functionally connected with the movement of the second curtain 24 has finished its operation, the lever 36 is rotated in order to bring the automatic diaphragm mechanism, the mirror lifting mechanism and so on in their original positions, whereby the operation cycle of camera is completed, which is to be explained later in detail.

When the shutter dial 37 is set at E.E., the switch S4 is connected with the terminal ③ in FIG. 2 and 3, while when the shutter dial 37 is adjusted in such a manner that the exposure time is set manually, the switch S4 is now connected with the terminal ④ in such a manner that no electric current flows in the part before the memory circuit so that the electric power of the source can be economized. In case of the present embodiment the manual setting mechanism consists of the variable resistor VR', the exposure time change over disc 39 is rotated by the pin 38 fixed on the shutter dial 37, and the contact 40 functionally connected with the above mentioned disc 39 slides over the resistance body VR' in such a manner that the exposure time is set.

When the shutter dial 37 is set on B, the cam 41 functionally connected with the above mentioned shutter dial 37 rotates the change over lever 42 clockwise around the pivot 43 in such a manner that the switch S6 is opened so that the electrical circuit stands in the opened state, whereby further the B-set keeping lever 44 having its fulcrum on the change over lever 42 is also rotated clockwise around the pivot 43. When in the above mentioned state the pin 45 fixed on the release element 28 is lowered, the above mentioned B-set keeping lever 44 is also lowered and its extremity 44a engages with the second curtain stopping lever 34 of the above mentioned electromagnet 32 in such a manner that the shutter is kept in the opened state. When the shutter button 26 is released, the release element 27 is raised again and the second curtain stopping lever 34 is released in such a manner that the second curtain 24 is closed. Even if hereby the B-set keeping lever 44 is constructed in such a manner that the rotation of the set lever 33 is hindered, the B-set is possible.

Element 46 is the light dividing equipment which receives the light coming through the lens 2 and reflected by the reflex mirror 47, and which serves for example as a focussing screen, a condensor lens or the like in the light path for the finder. The light reflected from the light dividing equipment 46 is led to the T.T.L. light receiving element R. Element 48 is the pointer of the meter A, and installed on a plane equivalent to the focus plane in such a manner that the pointer gives upon the window 49 for leading the finder information to the finder optics, serving to indicate the exposure time and so on in the finder view field or its neighborhood.

Figures 9, 10:
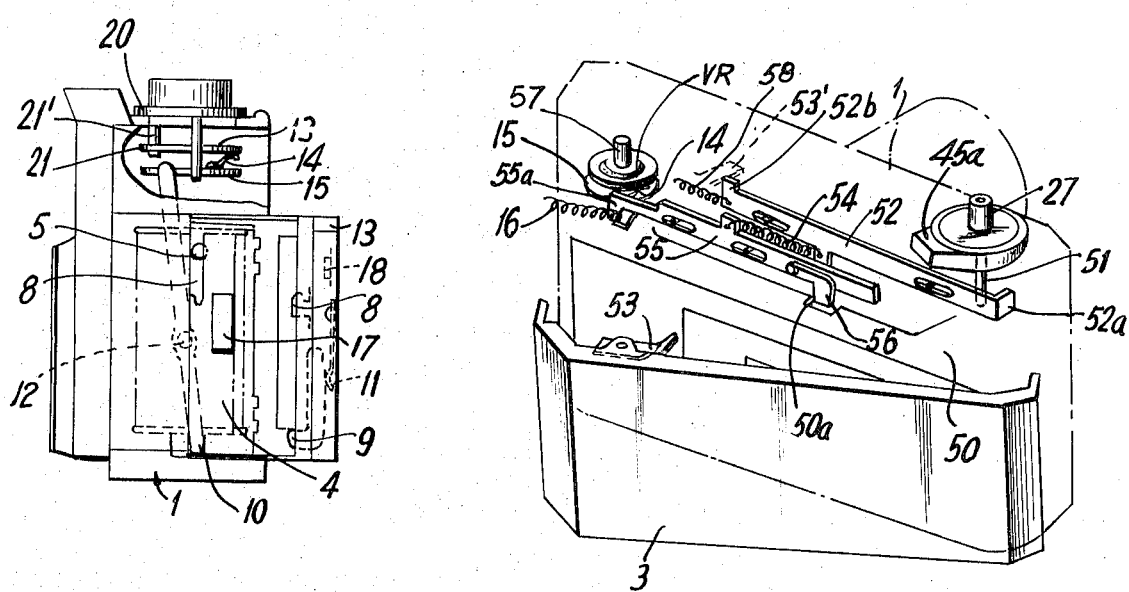

FIG. 10 shows the main mechanism in which the sensitivity of film is automatically set in case of the cartridge having a cut off corresponding to the sensitivity of film. Below the construction and operation are explained in detail.

The cartridge 50 is put in the camera body 1 and the back cover 3 is closed. The pin 5' functionally connected with the wind up lever 45 swings counterclockwise and the angle 52a provided at the one end of the first slide lever 52 is pushed to the right in such a manner that the first lever 52 is moved to the right. At this time the lever 53 on the back cover 3 is once retired back by means of the other end 52b of the above mentioned lever 52 from the position 53' and returns again in the position 53'. When the first slide lever 52 takes the position as shown in the drawing, the first lever 52 now under the effect of the coil spring 58 engages with 53' in such a manner that 52b is kept by means of 53'. Consequently the movement of the first lever to the right is possible only at the first winding up after the back cover 3 is closed. This operation is generally essential before taking photography so that the practical compensating system for the sensitivity of the film can thus be established. When the first slide lever 52 is moved to the right, the second slide lever 55 under the effect of the spring 54 is also moved to the right till the engaging lever 56 pivoted on the second slide lever 55 engages with the cut off of the cartrige 50 in such a manner that the further movement of the second slide lever to the right is no longer possible. The end piece 55a of the second slide lever 55 rotates the above mentioned rotary disc 15 against the spring 16 for example counterclockwise around the film rewinding pivot 57. Thus similarly to the above mentioned construction the relative position of the slidable contact or 14 to the variable resistor VR is determined in such a manner that in the electronic shutter according to the present invention the information of the sensibility of film is automatically set at the first film winding. The winding up lever 45 can be naturally driven by the motor or the functionally connected with the first movement of shutter charge.

Figure 11:
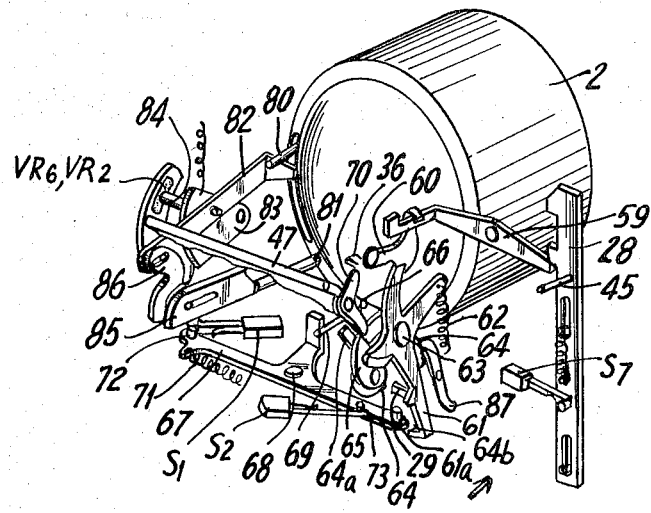
Figure 12:
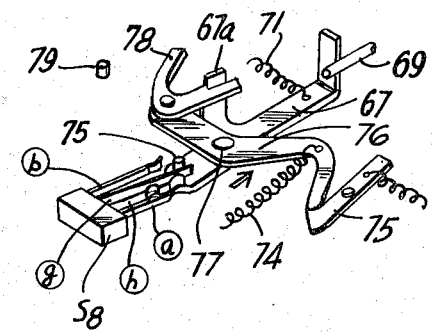

FIG. 11 is a drawing to show the relation of the variable resistor VR' with the automatic diaphragm, the mirror lifting up mechanism, and various signal pins of interchangeable lens in perspective view, whereby each part is shown in wound up state that is charged state.

Below the present invention is explained in detail according to the embodiment in FIG. 7.

When the shutter button 27 is pushed the release element 28 is lowered in such a manner that the switch $S_7$ is closed, whereby further the lever 59 is rotated in such a manner that the anchor shaped lever 60 is rotated counterclockwise around the pivot. The main lever 61 is rotated clockwise around the pivot 63 by means of the spring 62 while at the same time the claw lever 65 situated on the mirror driving lever 65 is also rotated clockwise in such a manner that the one end 64a of the mirror driving lever 64 pushed the push up pin 66 to lift the reflex mirror 47. The other end 64b of the mirror driving lever 64 rotates the automatic diaphragm lever 67 clockwise around the pivot 68. Then the diaphragm pin on the lens side in knocked and the diaphragm of the lens 2 is set at a certain determined value.

With the one end 61a of the main lever the securing lever 29 of the shutter in FIG. 4 is moved in such a manner that the shutter is actuated and after the movement of the second curtain is finished the lever 36 is moved in such a manner that the forked lever 70 is rotated clockwise around the pivot to release the engagement of the above mentioned claw lever 65 with the main lever 61 so that the mirror driving lever 64 is rotated counterclockwise around the pivot 63 whereby the reflex mirror 47 is brought back in the 45° declined position, the automatic diaphragm lever 67 is rotated counterclockwise around the pivot 68 by means of the spring 71 and the diaphragm return to the opened state. On the above mentioned automatic diaphragm lever 67 which carries out a reciprocating movement the nobs 72 and 73 are provided, above which the switches S1 and S2 of the electrical circuit are provided whereby all the element are disposed on the same element 67 in order that the quantity of the light received through the lens before the start of the movement of automatic diaphragm mechanism in the single lens reflec camera is stored or memorized.

As to the interchangeable lens groups applied in the present embodiment, either the automatic diaphragm equipment which stops down the diaphragm opening to a certain determined value is provided or the diaphragm preset cam is independently provided inside of the lens in a free state while the lens diaphragm ring which actuates the above mentioned cam from outside and the functionally connected element which actuate the above mentioned cam from the camera body side are provided in case the interchangeable lens is equipped with the diaphragm preset cam which preset the diaphragm opening at a certain determined value in order that the preset position of diaphragm of the automatic diaphragm equipment can be adjusted from at least one of the lens diaphragm ring and the functionally connected element, whereby as other construction it can be constructed in such a manner that the above mentioned functionally connected element can be driven by means of the second diaphragm ring installed on the camera side, in such a manner that by means of the above mentioned lens diaphragm ring the preset position of diaphragm of the above mentioned automatic diaphragm equipment is adjusted manually, the functional connection between the diaphragm ring and the above mentioned preset cam is cut by the diaphragm ring, and the aobve mentioned preset cam is rotated in functional connection with the exposure control mechanism of E.E. equipment as the stopper of which control mechanism the meter pointer or the like on the camera side serves in order that the preset position of the above mentioned automatic diaphragm is automatically adjusted, further in such a manner that as the above mentioned stopper the limiting element installed on the servo-ring driven from the light measuring equipment on the camera side is used, or in such a manner that the second stopper which limits the moving range of the above mentioned exposure control mechanism is installed in order that the moving range of the above mentioned exposure control mechanism is controlled corresponding to the range in which the preset position of the above mentioned preset cam is automatically adjusted, or in such a manner that the above mentioned exposure control mechanism is constructed as a light measuring-equipment or an exposure control equipment having at least one electrical element of variable resistance, variable capacity or the like, and the above mentioned preset cam is made to follow the rotation of the above mentioned lens diaphragm ring in order that the light measuring operation or the exposure control operation of pointer following system or of zero method system is carried out, further in such a manner that by installing a light measuring system change over means in order to be used for the camera of open diaphragm light measuring system as well as for that of closed diaphragm light measuring system the operation of the above mentioned automatic diaphragm equipment to stop down the diaphragm opening to a certain determined value is made to be carried out in functional connection with the operation start of the exposure means, whereby the light measuring equipment works in the opened state of diaphragm while the closed diaphragm light measuring is carried out in case the functional connection with the operation start of the light measuring means is released, or in such a manner that some proper means is installed to give the information proper to the lens body such as the information of the fully opened value of diaphragm opening to the light measuring equipment and/or the exposure control equipment by arranging a pin proper to the lens body.

Figure 7:
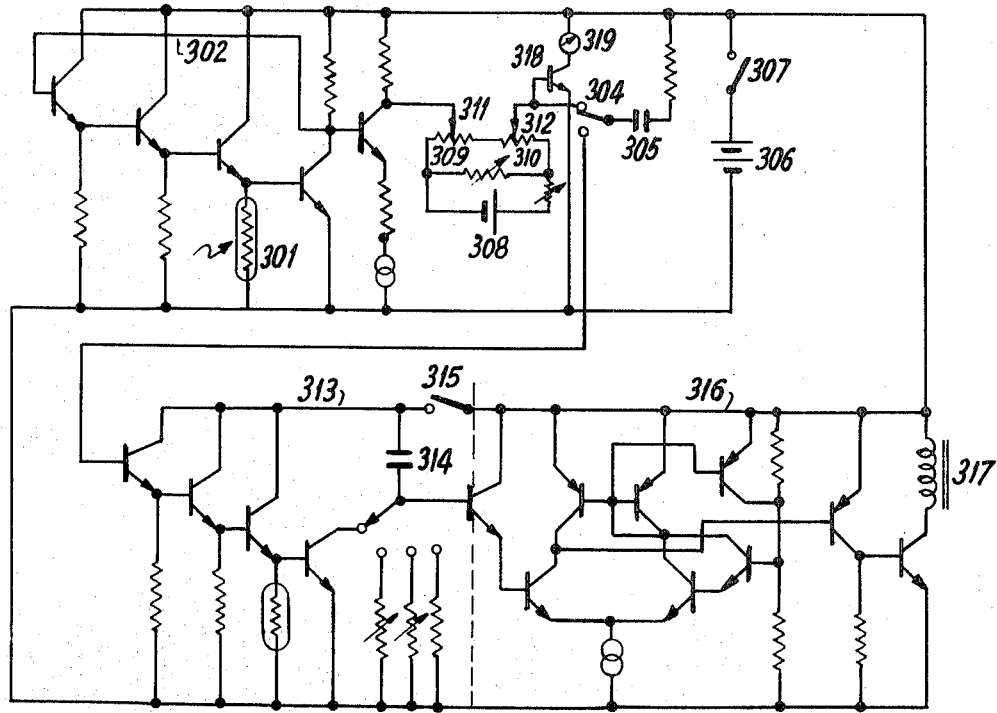

FIG. 7 shows an arrangement having its compensating equipment to give the preset value of the lens 2 for the through-the-fully-opened-aperture light measurement to the variable resistor of the electric shutter.

The lens has the diaphragm signal pin 80 for conveying a step signal and the diameter pin 81 for conveying an open diameter, whereby by means of the diaphragm signal pin 80 the variable resistor VR' is adjusted through the levers 82, 83, and 84, while by means of the slide lever 85 to be compensated by the diameter pin 81 and the forked lever 86 having a long slit, the above mentioned lever 82 is compensated. 87 is the lever to lift up the mirror.

Figure 8:
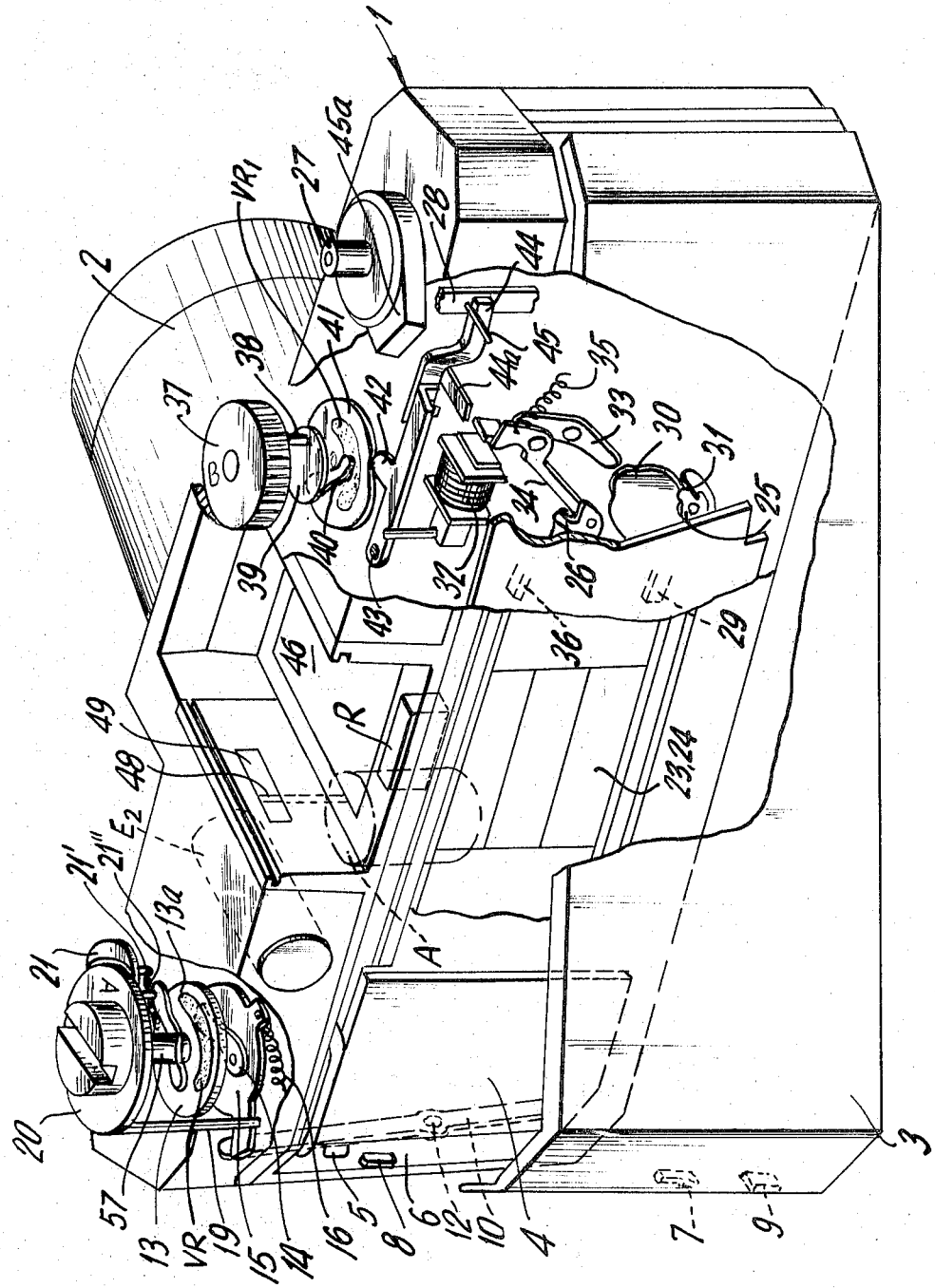
Figure 13:
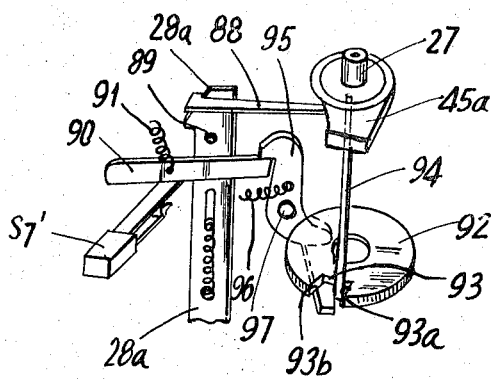

FIG. 13 shows another construction to show the relation between the automatic diaphragm lever and the switch. In FIG. 8 the mirror lifting mechanism and the automatic diaphragm mechanism operate independently of each other. The explanation follows.

FIG. 13 shows the construction of the switch $S_8$ in wound up state and situated beside the nob 75 of the automatic diaphragm lever system having strong and week springs 74 and 71 apart from the mirror driving system. When the securing lever 75 is rotated, the driving lever 76 of the automatic diaphragm is rotated clockwise around the pivot 77, the claw part 67a of the lever 67 of the automatic diaphragm is rotated by means of the cut-off of the forked lever 78 pivoted on the driving lever 76 of the automatic diaphragm in such a manner that the diaphragm of the lens 2 is stopped down by means of the diaphragm pin 69. The nob 75 on the one end 67b of 67, moves to the left, while the contact piece g of the switch $S_8$ leaves contact pieces ⓐ and ⓑ and enters into contact with contact piece ⓑ due to its nature.

When the exposure is finished, the release pin 79 of the second curtain system is rotated and strikes the forked lever 78 to disengage the one end 67b of 67 in such a manner that the automatic diaphragm returns to its original state. Hereby this part is charged by the movement along the direction of arrow.

FIG. 9 shows the switch of the electrical source in the circuit according to the present invention.

When the shutter button 27 is pushed, the connecting lever 88 is lowered, the release element 28 is lowered due to the declined surface 28a of the release element 28, and by means of the pin situated on the element 28 the element 90 functionally connected with the switch is rotated clockwise around its pivot against the spring 91 in such a manner that the main switch $S_7'$ is closed. When the shutter button 27 is released, the main switch $S_7'$ is opened. $S_7'$ is identical with the main switch $S_7$ in FIG. 7. The switch is hereby constructed in such a manner that the element 90 functionally connected with the switch is held making use of the reserved angle of the winding up lever.

The reserved angle is made due to the cut-off 93 of the disc 92, whereby when the pin 94 of the winding up lever 45 strikes the right end 93a of the cut-off, the lever 95 is rotated counterclockwise around the pivot by means of the spring 96 in such manner that the above mentioned element 90 functionally connected with the switch is always kept after the shutter button is pushed.

When the winding up lever is brought into the camera condition where the reserved angle is returned to zero, the pin 94 of the winding up lever 45 is situated at the left end 93b of the cut-off and the lever 95 is rotated clockwise around the pivot 97 in such a manner that the above mentioned element 90 functionally connected with the switch is released.

So far the electric shutter according to the present invention and the camera system equipped with the electric shutter are explained in detail, whereby it is characterized therein that in the negative feedback circuit of the operation amplifier the memory condensor and the compensating element are inserted in order to memorize the informations for the electric shutter of a single lens reflex camera so that the informations are stored with sure while the circuit is constructed quite effectively with the integral circuit. The gain of the operation amplifier can be chosen large enough while the temperature and external noise can be effectively avoided. It goes without saying that hereby it is essential to select each designed value, taking the temperature compensation of each circuit element inserted in the present circuit and the circuit as a whole into consideration. According to the present invention the storage characteristics is remarkably improved and it is possible to offer a very efficient exposure system even when the exposure takes rather long time or the system is operated in a digital way or by means of the A.C. signal. In order to cut the storage time short it is also possible to construct the switch for the above mentioned storage as a sample holding circuit. Thus the memory in case of rather long exposure time can easily be shortened as small as one hundredth.

Further for the camera system every information provision as well as every signal transmission is taken into consideration, the present invention will not only contribute much to the system camera but also the handling, the productivity, the durability and so on are very efficient for every construction.

Although the storage capacitor is connected with the operation amplifier with excellent storage characteristics, it is desirable to use such a capacitor as has an excellent storage characteristics such as polyethylene, polystyrol condensor or the like in order to reduce internal leakage.

What is claimed is:

1. An electric shutter, comprising light sensing means for producing an output corresponding to the light sensed, storage means coupled to said sensing means for storing electrical values on the basis of the output from said sensing means, compression means coupled to said storage means and said sensing means for logarithmically compressing the output of the sensing means so that the value stored by said storage means is a logarithmic compression of the output of said sensing means, variable timing means for opening and closing the shutter at a variable rate after initiation of the timing means, circuit means coupling said storage means to said timing means for varying the rate at which the timing means operates on the basis of the value in said storage means, first switch means coupled to said storage means for decoupling said storage means from said light sensing means and said compression means so as to cause said storage means to maintain a constant value after operation of said first switch means, and second switch means operable after said first switch means for initiating operation of said variable timing means, said storage means including an operational amplifier and capacitor in feedback connection across said operational amplifier.

2. An apparatus as in claim 1, wherein said compression means form a second feeback path across said operational amplifier.

3. An apparatus as in claim 2, wherein said light sensing means includes a photoelectric element, a pair of variable resistors establishing a variable voltage, the values of said resistors representing photographic values, a comparator between said photoelectric element and the voltage established by said resistors, and connecting means for coupling said light sensing means to said storage means through said first switch means.

4. An apparatus as in claim 2, wherein said circuit means includes input means for atenuating the value from said storage means on the basis of photographic information.

5. An apparatus as in claim 4, wherein said input means includes a resistor bridge, and a voltage source applied across said resistor bridge.

6. An apparatus as in claim 1, further comprising second switch means operable after said first switch means for initiating operation of said variable timing means.

7. An electric shutter, comprising light sensing means for producing an output corresponding to the light sensed, storage means coupled to said sensing means for storing electrical values on the basis of the output from said sensing means, compression means coupled to said storage means and said sensing means for logarithmically compressing the output of the sensing means so the valve stored by said storage means is a logarithmic compression of the output of said sensing means, variable timing means for opening and closing the shutter at a variable rate after initiation of the timing means, circuit means coupling said storage means to said timing means for varying the rate at which the timing means operates on the basis of the value in said storage means, first switch means coupled to said storage means for decoupling said storage means from said light sensing means and said compression means so as to cause said storage means to maintain a constant value after operation of said first switch means, and second switch means operable after said first switch means for initiating operation of said variable timing means said storage means including a capacitor, and a comparator circuit comparing the voltage across said capacitor with a predetermined value, and feedback means connected to the output of said comparator means and one of the inputs of said comparator means.

8. An electric shutter, comprising light sensing means for producing an output corresponding to the light sensed, storage means coupled to said sensing means for storing electrical values on the basis of the output from said sensing means, compression means coupled to said storage means and said sensing means for logarithmically compressing the output of the sensing means so the value stored by said storage means is a logarithmic compression of the output of said sensing means, variable timing means for opening and closing the shutter at a variable rate after initiation of the timing means, circuit means coupling said storage means to said timing means for varying the rate at which the timing means operates on the basis of the value in said storage means, first switch means coupled to said storage means for decoupling said storage means from said light sensing means and said compression means so as to cause said storage means to maintain a constant value after operation of said first switch means, and second switch means operable after said first switch means for initiating operation of said variable timing means said compression means includes a plurality of cascade connected transistors, each of said transistors being in common collector connection, said light sensing means being connected in series with one of said transistors, an output transistor, and a feedback path from said output transistor to the first of said cascade connected transistors.

9. An apparatus as in claim 8, wherein said compression means further includes biasing means, said biasing means including a source and potentiometer means connected across said source.

10. An apparatus as in claim 9, wherein said circuit means includes a regeneration circuit, said regeneration circuit having a plurality of cascade connected transistors, each of said transistors being in common collector connection, said timing means having a transistor forming an output transistor for said regeneration circuit.

11. An apparatus as in claim 9, wherein said potentiometer means include input means for setting values corresponding to the diaphragm aperture and the film sensitivity.

12. An apparatus as in claim 10, wherein said potentiometer means include input means for setting values corresponding to the diaphragm aperture and the film sensitivity.

13. An electric shutter comprising a light measuring circuit having a light receiving element, an operational amplifier responsive to the output of said light measuring circuit, a negative feedback circuit across said operational amplifier, a memory capacitor connected in said negative feedback circuit, a second negative feedback circuit in parallel with said capacitor and including circuit means having a resistive element, switching means for breaking the connection between said capacitor and said light measuring circuit and said first feedback circuit for stopping the change across that capacitor after a light measurement, a shutter mechanism including means for opening the shutter mechanism, a timer circuit including means for initiating the operation thereof in response to opening of the shutter mechanism and responsive to said operational amplifier so as to exhibit different delay times corresponding to the memorized value of the capacitor, and closing means coupled to said shutter mechanism and responsive to said timer circuit for closing the shutter mechanism after completion of the delay time of the timer circuit.

14. A shutter as in claim 13 wherein said light receiving element is a photoconductive element.

15. A shutter as in claim 14, wherein said light receiving element is a photo-electromotive element.

16. A shutter as in claim 14, further comprising input means for entering photographic information between said light measuring circuit and said operational amplifier.

17. An apparatus as in claim 16, further comprising indication means coupled to said memory capacitor for indicating the value of said memory capacitor.

18. An apparatus as in claim 17, wherein said indication means is a meter.

19. A shutter as in claim 13, wherein said circuit means includes compression means having a logarithmic characteristic.

20. A shutter as in claim 19, wherein said input means includes a comparator, said comparator having a first input terminal connected to said light measuring circuit and a second input terminal, a voltage divider having a variable resistor settable to the photographic information, said second terminal being connected to said voltage divider.

21. A shutter as in claim 19, further comprising setting means resonsive to the setting of a diaphragm and film sensitivity, said variable resistor being responsive to said setting means.

22. An electric shutter, comprising light sensing means for producing an output corresponding to the light sensed, storage means coupled to said sensing means for storing electrical values on the basis of the output from said sensing means, said storage means including an operational amplifier and a capacitor in feedback connection across said operational amplifier, variable timing means responsive to said storage means for opening and closing the shutter at a variable rate after initiation of the timing means and for varying the rate at which the timing means operates on the basis of the value in said storage means, switch means coupled to said storage means for decoupling said storage means from said light sensing means so as to cause said storage means to maintain a constant value after operation of said switch means.

23. An apparatus as described in claim 22, wherein said storage means further includes compressions means coupled to said capacitor and sensing means for logarithmically compressing the output of the sensing means.

24. An apparatus as in claim 22, wherein said light sensing means includes a photoelectric element, a pair of variable resistors establishing a variable voltage, the values of said registors representing photographic values, a comparator between said photoelectric element and the voltage established by said resistors.

25. An apparatus as in claim 22, further comprising circuit means for varying the rate at which the timing means operates on the basis of the value in said capacitor between said storage means and said variable timing means.

26. An apparatus as in claim 25, wherein said circuit means includes input means for attenuating the value from the storage means on the basis of photographic information.

27. An apparatus as in claim 26, wherein said input means includes a resistor bridge, and a voltage source applied across said resistor bridge.

28. An apparatus as in claim 25, wherein said circuit means include logarithmic expander circuit.

29. An apparatus as in claim 25, wherein one of said sensing means and said circuit means includes input means for establishing electrical values corresponding to photographic conditions, said input means including lever means responding to a projection of a magazine holding film to be exposed, said input means further including alternating setting means having a pair of rods and manually operable means in the event that the magazine does not have projections.

30. An apparatus as in claim 29, wherein said input means further includes means for setting the diaphragm aperture.

* * * * *

UNITED STATES PATENT OFFICE
CERTIFICATE OF CORRECTION

Patent No. 3,852,774   Dated December 3, 1974

Inventor(s) TATSUYA TAGUCHI, YUKIO IURA & YOSHIYUKI TAKISHIMA

It is certified that error appears in the above-identified patent and that said Letters Patent are hereby corrected as shown below:

In the heading of the patent:

The second Foreign Application Priority Data should read:

--Feb. 10, 1970 Japan................Sho 45-13174--

Signed and sealed this 11th day of March 1975.

(SEAL)
Attest:

RUTH C. MASON
Attesting Officer

C. MARSHALL DANN
Commissioner of Patents
and Trademarks